United States Patent [19]

Ruozi

[11] 4,015,667
[45] Apr. 5, 1977

[54] COTTON STALK AND ROOT SHREDDER WITH RE-BEDDER

[76] Inventor: Aldo Ruozi, 157 N. McDonald Way, Bakersfield, Calif. 93309

[22] Filed: Apr. 14, 1975

[21] Appl. No.: 568,127

[52] U.S. Cl. .............................. 172/133; 171/58; 171/62; 172/146; 172/181; 172/194; 172/200; 172/700
[51] Int. Cl.² .................. A01B 35/18; A01D 43/12
[58] Field of Search .......... 172/133, 145, 146, 180, 172/181, 193, 194, 199, 200, 419, 604, 699, 700; 171/24, 28, 58, 62; 56/504, 503, 53, 60; 29/121 R, 121 A; 130/5; 111/3

[56] References Cited

UNITED STATES PATENTS

| | | | |
|---|---|---|---|
| 135,829 | 2/1873 | Love | 172/700 |
| 176,350 | 4/1876 | Pusey | 172/419 |
| 184,171 | 11/1876 | Porter | 172/700 |
| 203,311 | 5/1878 | Adams et al. | 56/60 |
| 425,210 | 4/1890 | Cobb | 172/180 |
| 1,113,241 | 10/1914 | Niesz | 172/604 X |
| 1,635,605 | 7/1927 | Chancey | 172/700 |
| 1,821,131 | 9/1931 | Bailey | 171/58 X |
| 3,160,214 | 12/1964 | Ruozi | 171/58 |
| 3,294,046 | 12/1966 | Boots | 111/3 |
| 3,770,064 | 11/1973 | Scarnato et al. | 171/58 |

FOREIGN PATENTS OR APPLICATIONS 246,642 12/1962 Australia .......................... 172/419

*Primary Examiner*—Paul E. Shapiro
*Attorney, Agent, or Firm*—Clarence A. O'Brien; Harvey B. Jacobson

[57] ABSTRACT

A root and stalk shredder having a frame, a pair of longitudinally extending, parallel, power driven lifting rollers rotatably mounted on the frame and extending longitudinally parallel to a path of travel of the shredder, guide means mounted on the frame forward of the rollers in the direction of movement of the shredder for guiding stalks between the rollers, a blade assembly mounted on the frame over the rollers and operatively associated with the rollers for cutting roots and stalks lifted by the rollers, and a plow assembly mounted on the frame and provided with a fin assembly for facilitating use of the shredder to re-shape a bed being cleared. A bed re-shaping assembly is mounted at the rear end of the shredder frame for covering over shredded crop residue deflected down into the bed by a deflector shield also arranged at the rear of the shredder frame. Advantageously, a disc blade assembly is arranged at the front of the shredder frame for clearing a pathway for the plow assembly through heavy weeds, debris, and the like. The blade assembly may comprise two overlapping sets of vertically spaced blade clusters, while the lifter rollers are advantageously provided with resilient sleeves on cylindrical portions of the rollers rearward in the shredder frame. These resilient sleeves are constructed so as to form a plurality of longitudinally extending ribs which may be reinforced by rods, and the like, so as to prolong the life of the sleeves. Generally Y-shaped handles associated with wheel assemblies which movably support the frame of the shredder facilitate adjustment of the wheel assemblies in order to obtain proper leveling of the shredder frame relative to a surface being worked. In a modified embodiment of the shredder, the blade clusters may be arranged for rotation about a horizontal axis as opposed to parallel vertical axes in order to obtain finer shredding of the crop residue and to achieve adaptability of the shredder to crop beds having different row spacings.

16 Claims, 14 Drawing Figures

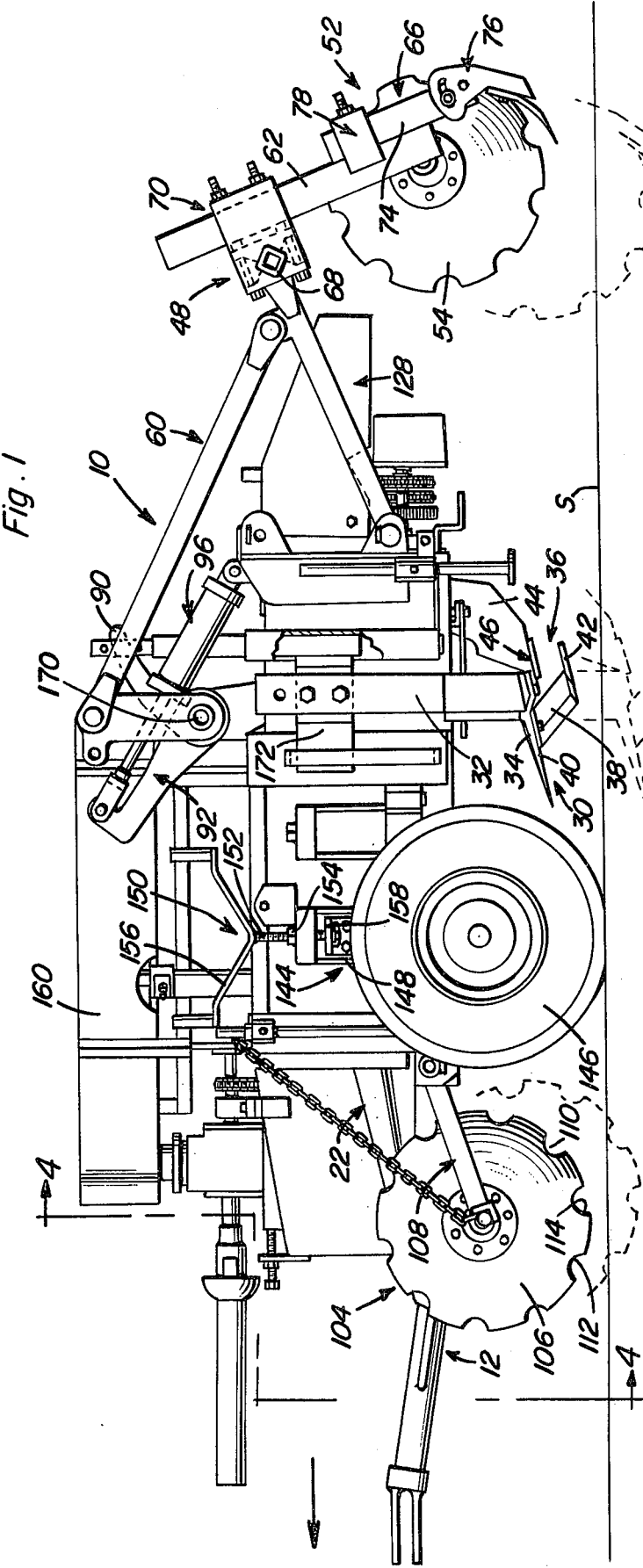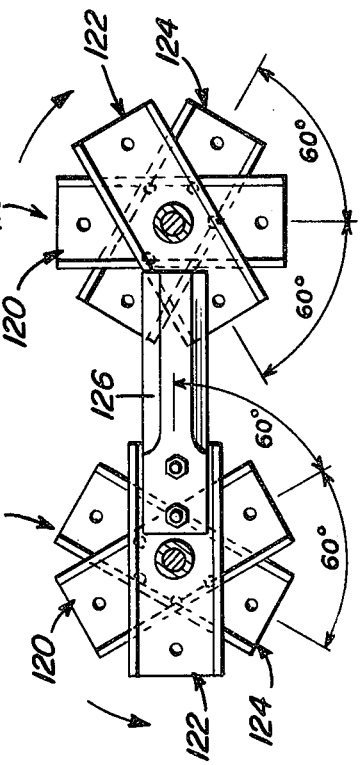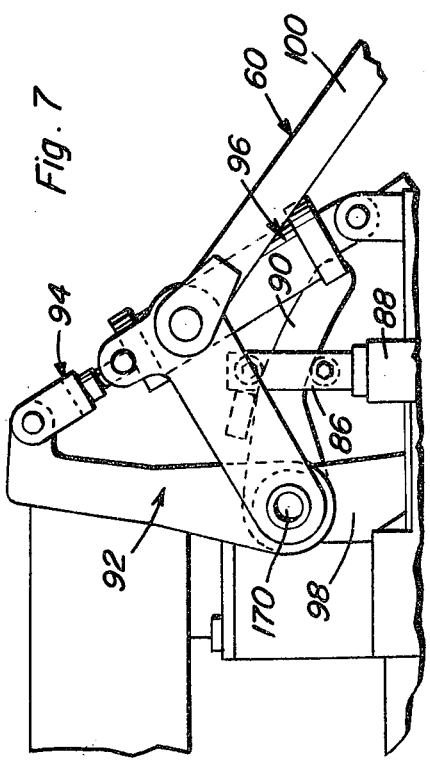

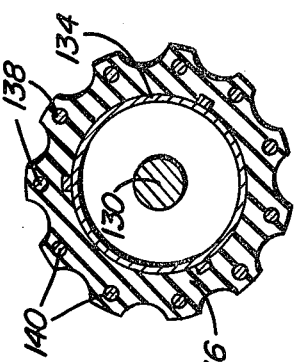
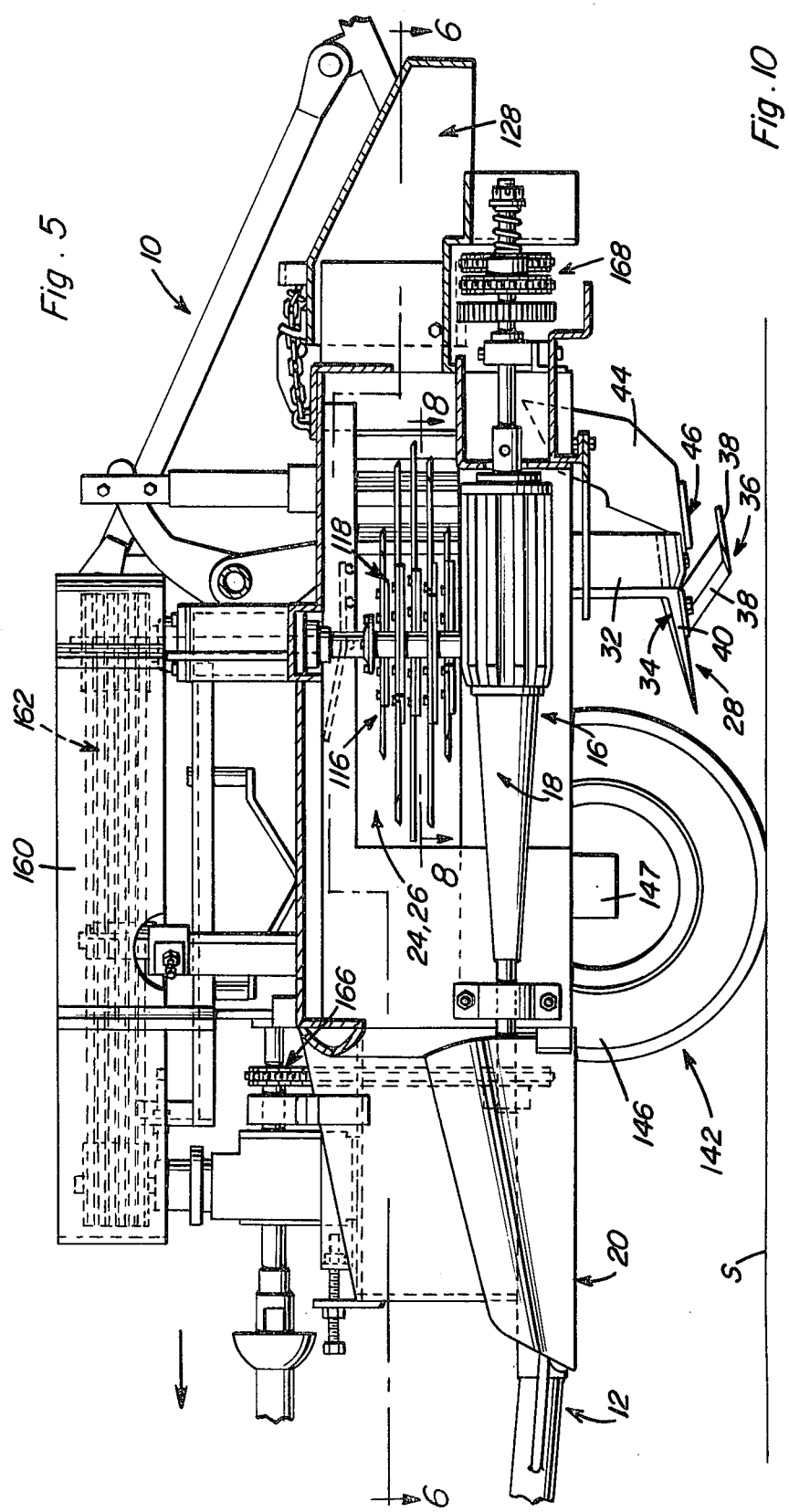
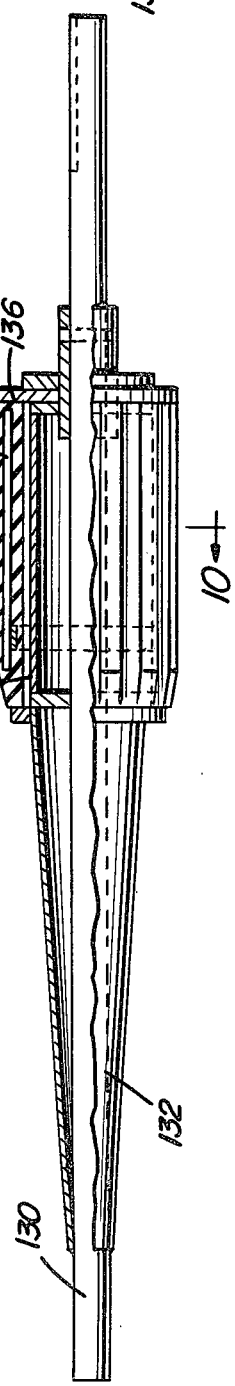

COTTON STALK AND ROOT SHREDDER WITH RE-BEDDER

BACKGROUND OF THE INVENTION

1. Field of the invention

This invention relates generally to a stalk and root lifting and shredding device, and particularly to a new and useful improvements in such a device whereby the ground being cleared of stalks is re-bedded so as to be prepared for future planting.

2. Description of the Prior Art

Conventional farming methods, particularly plowing, have recently been criticised because they tend to compact the soil in areas where crops are to be planted. It has been found, however, that this undesirable compaction can be eliminated by controlling the movements of wheeled vehicles through the cultivated fields in such a manner that the wheels of the vehicles always pass along the same tracks and the same areas are always employed for planting of crops. In this manner, compaction, as by the wheels of the vehicle, is avoided in those areas where crops are to be planted, with better growing conditions and yields resulting. Technically stated, when the root system of a crop is confined on the sides thereof by compacted soil in the interrows and by the plowsole of the bottom, root distribution is poorer in the harrowsole or first layer below the surface of the ground. By controlling the traffic strip through the filed, this poor root distribution can be eliminated and time and expense of plowing reduced in the process.

Accordingly, the present invention represents an improvement on the stalk and root lifting and shredding device disclosed in my prior U.S. Pat. No. 3,160,214, issued Dec. 8, 1964, which permits the use of the lifting and shredding device to carry out the controlled wheel technique and permit rebedding of the areas from which the cotton stalks and roots are removed.

It is generally known to employ toothed wheels arranged to dig into the ground and perform such tasks as harvesting sugar beets and rejuvenating sugar cane stubble. Examples of agricultural machinery employing wheels in such a manner are found in U.S. Pat. Nos. 3,010,522 and 3,181,616 issued on Nov. 28, 1961 and May 4, 1965, respectively, to H. C. Oppel, and in U.S. Pat. No. 3,294,046, issued Dec. 27, 1966, to V. A. Boots. Further, U.S. Pat. Nos. 1,117,314, issued Nov. 17, 1914 to R. A. Blunck, U.S. Pat. No. 2,484,802, issued Oct. 18, 1949 to J. L. Aasland, and 3,437,152, issued Apr. 8, 1969 to T. A. Barrentine, show examples of stalk cutters provided with vertical cutting blades— that is, blades which rotate about a horizontal axis. These known arrangements of toothed wheels and vertical cutting blades, however, are not generally suited for adapting a cotton stalk and root shredder for use in rebedding operations.

U.S. Pat. No. 1,635,605, issued July 2, 1927 to W. H. Chancey, discloses a sub-soil attachment for permitting a plow to loosen soil a slight or considerable distance, as desired, beneath the plow blade. This plow attachment, however, will not maintain the same opening in the soil year after year as required by the re-bedding technique, but will rather create a slot the identity of which will be lost immediately thereafter.

SUMMARY OF THE INVENTION

It is an object of the present invention to provide a cotton stalk and root shredder capable of carrying out re-bedding techniques.

It is another object of the present invention to provide bed reshaping attachments for a cotton stalk and root shredder.

It is still another object of the present invention to provide a cotton stalk and root shredder having cutting blades adjustable to different row spacings.

It is still another object of the present invention to provide a cotton stalk and root shredder having lifting rollers and cutting blades of improved construction.

These and other objects are achieved according to the present invention by providing a root and stalk shredder having: a frame movable in a direction of movement along a path of travel; a pair of longitudinally extending, parallel, power driven lifting rollers rotatably mounted on the frame and extending longitudinally parallel to the path of travel; guides mounted on the frame forward of the rollers in the direction of movement for guiding stalks between the rollers; a blade assembly mounted on the frame over the rollers and operatively associated with the rollers for cutting roots and stalks lifted by the rollers; and a plow assembly mounted on the frame and including a standard attached to the frame, an earth engaging digging blade affixed to the standard and arranged vertically below and centrally between the rollers substantially rearward of the rollers along the path of travel of the frame for effecting a splitting of the earth and freeing of the roots subsequent to an initial grasping of the stalks by the rollers, a fin assembly comprising a fin attached to an undersurface of the digging blade and extending cantilever fashion away from the digging blade and the standard to a free end, and an uplifting wing mounted on the free end of the fin and transversely to the fin. The fin assembly is arranged for fracturing the soil below the digging blade, preventing soil compaction by the digging blade, and facilitating direction of plant root growth. A furrowing-out shovel blade is advantageously attached to the standard of the plow assembly adjacent to the digging blade thereof, and is arranged extending substantially rearwardly of the standard along the path of travel of the frame for splitting the soil of a bed and leaving a furrow open for receiving shredded crop.

A bed re-shaping assembly can be arranged rearwardly of the shredder frame relative to the direction of movement of the frame. This bed reshaping assembly advantageously includes a pair of notched disc blades mounted on the frame so as to be lifted and lowered relative to the frame and selectively engaging the disc blades into a bed being re-shaped. First and second tool bars are adjustably connected to a bracket supporting the disc blades, with the latter being rotatably mounted on the first and second tool bars. A tool bar assembly also mounted on the disc blade supporting bracket adjacent to the disc blades advantageously includes a third tool bar adjustably attached to the first tool bar and a sweep blade adjustably mounted on the third tool bar at a point thereof spaced from the attachment of the third tool bar to the first tool bar. The first and third tool bars are preferably arranged extending in substantially parallel planes.

A front disc blade assembly comprising a further disc blade and a pivotally mounted bracket is advantageously attached to a forward portion of the shredder frame. The further disc is provided with at least one notch having a front part and a rear part relative to the direction of movement of the shredder frame. Contact with the ground being working rotates the further disc blade, and the front part of the notch clears a pathway while the rear part of the notch lifts stalks up and alines and directs the stalks lifted into the lifting rollers.

A deflector shield is mounted on the shredder frame at the rearward portion thereof so as to extend toward the disc blades of the bed re-shaping assembly for deflecting shredded residue fed from the blade assembly and directing the residue into the surface of ground over which the frame is moving. Preferred lifting rollers for a shredder according to the present invention have cylindrical portions arranged rearward of the rollers relative to the direction of movement of the frame. A sleeve constructed frm a resilient material is arranged in conforming engagement of the cylindrical portion of an associated roller, with the sleeve being provided with a plurality of longitudinally extending, outwardly projecting ribs on an outer surface of the sleeve. Further, a plurality of longitudinal rods are preferably embedded in each lifting roller sleeve, with each rib having a rod associated with it for absorbing shock and prolinging wear of the sleeve. The use of the resilient material on the lifting rollers prevents buildup of mud, and the like, on the cylindrical portion of the rollers during wet conditions.

The frame advantageously includes a pair of wheel assemblies for supporting the frame in a movable manner. Each wheel assembly preferably comprises a vertically adjustable wheel, a vertical wheel standard attached to the wheel, a vertical channel for slidably mounting the standard, and a wheel crank assembly connected to the wheel standard for positioning the wheel in the channel. The crank assembly includes a threaded rod affixed to the wheel standard, a nut affixed to the channel, and a substantially V-shaped handle affixed to the threaded rod, with the latter being threadingly engaged in the nut. A wheel bracket mounted on the threaded rod connects the latter to the wheel standard.

The blade assembly may have blades arranged either horizontally or vertically. When horizontal, the blade assembly can have a plurality of vertically spaced levels of blade clusters, each of the blade clusters including three blades. Further, each of the blades has a pair of radially extending arms. with the arms of the blades equally spaced from one another. Two sets of these blade clusters preferably intermesh with one another to provide a highly effective shredding action.

When the blades are arranged vertically so that they rotate about a horizontal axis, the blade assembly includes a blade shaft rotatably mounted on the frame in a plane parallel to and transverse of the frame and supports at least one blade assembly affixed to the shaft for rotation therewith in a vertical plane, or a plane perpendicular to the transverse plane of the frame. The blade assembly can employ blade clusters including either radially extending stationary, splayed blades, or radially extending hinged flail blades, or a combination of splayed and flail blades.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view showing a cotton stalk and root shredder according to the present invention.

FIG. 5 is a fragmentary, sectional view taken generally along 5—line 5-13 5 of FIG. 2.

FIG. 7 is a fragmentary, detail view showing a portion of FIG. 1 to a larger scale.

FIG. 8 is a sectional view, with some parts removed, taken generally along the line 8—8 of FIG. 5.

FIG. 9 is a side elevational view, partly cut away and in section, showing a lifting roller according to the present invention.

FIG. 10 is a sectional view taken generally along the line 10—10 of FIG. 9.

DESCRIPTION OF THE PREFERRED EMBODIMENTS

Figure 2:
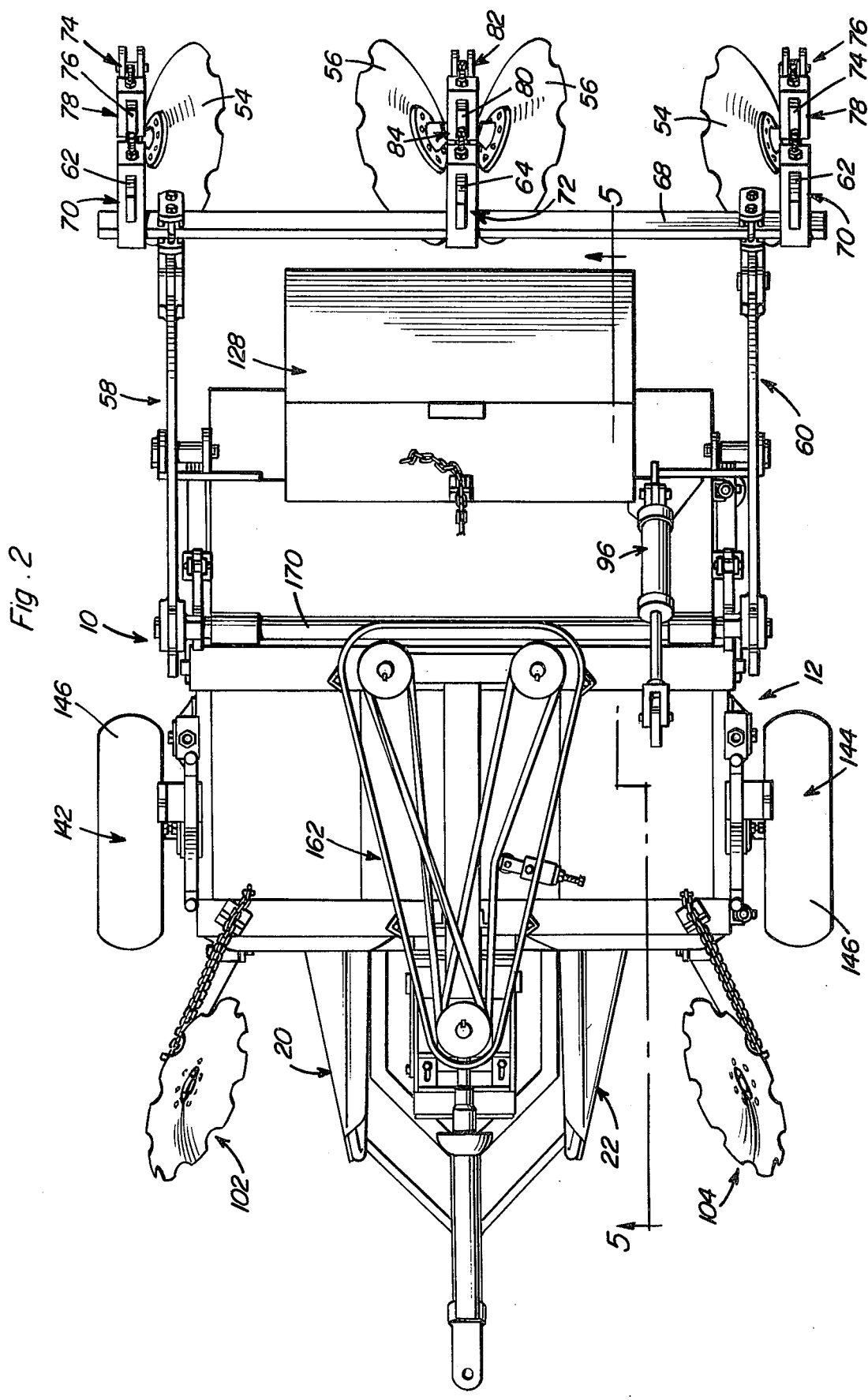
FIG. 2 is a top plan view showing the shredder of FIG. 1.

Referring now more particularly to FIGS. 1 through 6 of the drawings, a root and stalk shredder 10 according to the present invention has a frame 12 movable in a direction of movement along a path of travel indicated by the direction arrow in FIG. 1. Duplicate pairs 14 and 16 of longitudinally extending, parallel, power driven lifting rollers 18 are rotatably mounted on frame 12 in a conventional manner, and are arranged extending longitudinally parallel to the path of travel of frame 12. Guides 20 and 22, which may be eliminated under circumstances to be described below, are mounted on frame 12 forward of rollers 18 in the direction of movement of frame 12 for guiding stalks (not shown) between rollers 18. Further, blade assemblies 24 and 26 are provided on frame 12 over assemblies 18, and operatively associated with the rollers 18, for cutting roots and stalks, neither of which is shown in the drawings, lifted by rollers 18. Extending downwardly form frame 12 are a pair of plow assemblies 28 and 30 which will be described in detail below. It will be understood that roller pairs 14, 16, guides 20, 22, blade assebiles 24, 26, and plow assemblies 28, 30 are essentially duplicates of one another, with duplicate functions, and that only one of each of these pairs of devices is necessary to carry out the invention A plow assembly 28, 30 according to the invention advantageously includes a standard 32 attached to frame 12 in a suitable manner to be selectively raised and lowered relative to the frame. The preferred arrangement for slidably mounting standard 32 will be decribed below. An earth engaging digging blade 34 is affixed to standard 32 in a conventional manner and arranged vertically below and centrally between the associated pair 14, 16 of rollers 18 substantially rearward of rollers 18 along the path of travel of frame 12 for effecting a splitting of the earth, designated by the reference letter S, and freeing roots subsequent to an initial grasping of the stalks by roller 18. As can perhaps best be seen from FIG. 3, plow assemblies 28 and 30 are associated with roller pairs 14 and 16, respectively.

A fin assembly 36 includes a fin 38 affixed in a suitable manner to an undersurface 40 of digging blade 34 and is arranged extending cantilever fashion away from blade 34 and standard 32 to a free terminal end. An uplifting wing 42, which can be seen from FIGS. 3 and 4 of the drawings to have a general V-shape opened toward blade 34, is mounted on the free end of fin 38 and arranged transversely to the latter. Fin assembly 36 is arranged for fracturing soil below digging blade 34, preventing soil compaction by the digging blade 34, and facilitating directional plant root growth.

Figure 3:
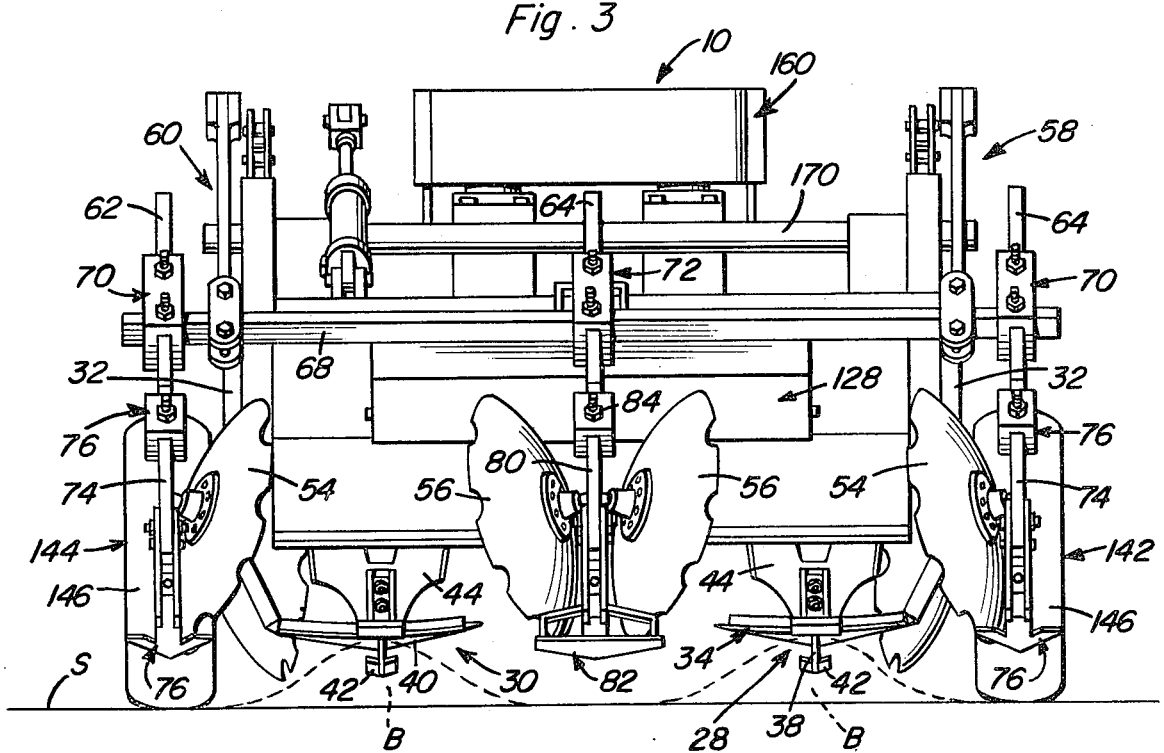
FIG. 3 is a rear elevational view showing the shredder of FIGS. 1 and 2.
Figure 4:
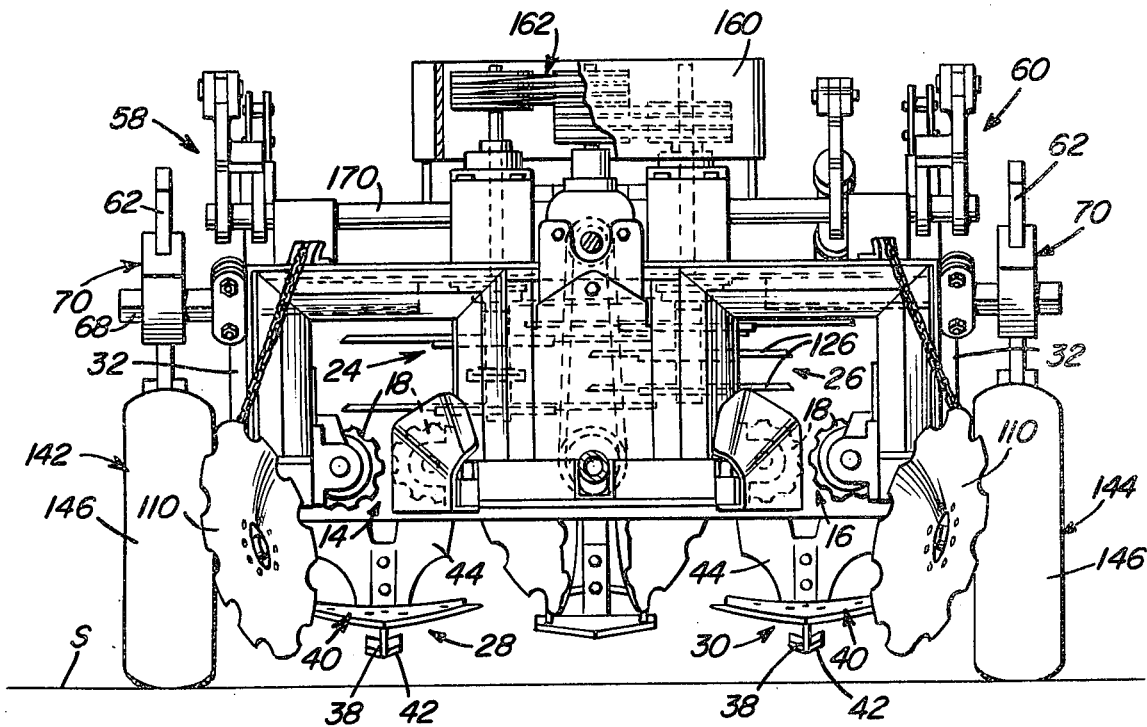
FIG. 4 is a sectional view taken generally along the line 4—4 of FIG. 1.

Each plow assembly 28, 30 is also provided with a furrowing-out shovel blade 44 attached to the associated standard 32 adjacent to digging blade 34 and arranged extending substantially rearwardly of the standard 34 along the path of travel of frame 12 for splitting the bed B, shown in FIG. 3, and leaving a furrow open for receiving shredded crop. A bracket assembly 46 is employed to mount shovel blade 44 to the bottom of standard 32 together with blade 34.

A bed re-shaping assembly 48 is arranged rearwardly of frame 12 relative to the direction of movement of the frame. This bed re-shaping assembly 48 advantageously includes, for example, two pairs 50 and 52 of notched disc blades 54 and 56. Bracket arrangements 58 and 60 mounted on frame 12 rotatably mount disc blades 54, 56 for lifting and lowering blades 54, 56 relative to frame 12 and selectively engaging blades 54, 56 in a bed B being re-shaped. First and second tool bars 62 and 64 are adjustably connected to bracket arrangements 58, 60, with disc blades 54, 56 being rotatably mounted on the first and second tool bars 62 and 64 at a point thereon spaced from the connection of bars 62 and 64 to bracket arrangements 58, 60. Further, a tool bar assembly 66 is mounted on the bracket arrangements 58, 60 together with and adjacent to the notched disc 56.

A crossbar 68 is mounted on and arranged extending between bracket arrangements 58 and 60 as by clamps 70, while a clamp 72 mounts tool bar 64 on crossbar 68. It will be appreciated that there are two tool bars 62 and only a single tool bar 64. In this way, a rugged and reliable structure is created in a simple manner.

Tool bar assembly 66 includes a third tool bar 74 adjustably attached to the first tool bar 62 associated therewith. A sweep blade 76 is adjustably mounted on third tool bar 74 as by clamp 78 at a point thereof spaced from the attachment of tool bar 74 to the associated tool bar 62. The tool bars 62 and 74 are advantageouly arranged extending in substantially parallel planes.

Yet another tool bar 80 supports a deflector plate 82 from tool bar 64 to which bar 80 is adjustably attached as by a clamp 84. As will be appreciated, plate 82 will assist disc blades 56 in re-shaping the old beds B.

Referring now to FIG. 7 of the drawings, a shaft 86 is slidably mounted in a slide 88 and is provided with a pair of pins which brace a rocker arm 90 attached to a crank arrangement 92, one arm of which is pivotally mounted to the free end of a piston rod 94 of a conventional linear fluid motor 96. Crank 92 and rocker arm 90 are attached to one another for movement as a unit and are journaled in a conventional manner as on a pedestal 98. As can be seen from FIGS. 1 and 7 taken together, bracket arrangement 60 is provided with a link 100 which is pivotally mounted to another arm of crank arrangement 92 than is pivotally mounted piston rod 94 so that bracket arrangements 58 and 60 will be swung about their pivotal mountings to frame 12 in order to raise and lower disc blades 54 and 56. It will be appreciated that motor 96 may be actuated in a convention manner.

Referring again to FIGS. 1 through 6 of the drawings, a pair of front disc blade assemblies 102 and 104 each includes a further disc blade 106 and a pivotally mounted bracket 108 attached to a forward portion of frame 12. Disc blades 106 are rotatably mounted on the pivotally mounted brackets 108 at a point thereon spaced from frame 12. The function of disc blades 106 is to clear a pathway for the plow assemblies 28 and 30, respectively, through heavy weeds, debris, and the like.

Disc blades 106 are provided with, for example, a plurality of notches 110, each of which notches 110 has a front part 112 and a rear part 114 relative to the direction of movement of frame 12. Contact with the ground rotates disc blades 106 in such a manner that front part 112 of notch 110 clears a pathway and the rear part 114 of notch 110 stalks up and alines and directs the lifted stalks into rollers 18.

Referring now more particularly to FIG. 8 of the drawings, blade assemblies 24, 26 each comprise three vertically spaced levels of blade clusters 116 and 118, respectively. Each of these blade clusters 116, 118 includes three blades 120, 122, and 124, with each of the blades 120, 122, 124 having a pair of radially extending arms 126. The arms 126 of the blades 120, 122, 124 are advantageously equally spaced from one another, with such spacing necessarily being approximately 60° as is indicated in FIG. 8.

Returning once again to FIGS. 1 through 6 of the drawings, a deflector shield 128 is mounted on frame 12 and arranged extending toward disc blades 54, 56 of the bed re-shaping assembly 48 for deflecting shredded residue (not shown) fed from the blade assemblies 24, 26 and directing the residue onto the surface of ground over which frame 12 is moving.

Referring now more particularly to FIGS. 9 and 10 of the drawings, lifting rollers 18 preferably are constructed around a shaft 130 on which is arranged a frusto-conical portion 132 and a cylindrical portion 134 rearward of portion 132. As will be appreciated from, for example, FIG. 5 of the drawings, portion 134 is rearward of the forward end of frame 12 relative to the direction of movement of the frame as shown by the direction arrow in FIG. 5. A sleeve 136 constructed from a resilient material is arranged in conforming engagement on portion 134, and is provided with a plurality of longitudinally extending, outwardly projecting ribs 138 on an outer surface of sleeve 136.

While sleeve 136 can be constructed of, for example, solid polyurethane or natural or synthetic rubber, it is preferable to embed within the area of ribs 138 a plurality of rods 140. Each rib 138 will have a rod 140 associated therewith, as can be seen in FIG. 10. The advantage of using rods 140 is that they will increase the capacity of the resilient sleeves 136 to absorb shock and thus prolong the life of the sleeves 136.

Returning once again to FIGS. 1 through 6 of the drawings, frame 12 is provided with a pair of wheel assemblies 142 and 144. Each assembly 142, 144 comprises a vertically adjustable wheel 146, a vertical wheel standard 147 connected to wheel 146, a channel 148 provided on frame 12 for slidably mounting the wheel standard 147, and a wheel crank assembly 150 connected to standard 147 for positioning standard 147 in channel 148. Wheel crank assembly 150 has a threaded rod 152 affixed to wheel standard 147, a nut 154 affixed to channel 148, and a substantially V-shaped handle 156 affixed to threaded rod 152, with the latter being engaged in nut 154. A wheel bracket 158 mounted on threaded rod 152 is connected to wheel standard 147 in order to transmit axial movement of rod 152, translated by rotary movement of rod 152 within nut 154, to standard 147 and thus position wheel 146 relative to frame 12. In this manner, hand actuation of handles 156 can quickly and easily obtain proper orientation of frame 12 relative to an area being traversed by shredder 10.

A housing 160 advantageously covers a drive train 162 which connects the conventional power output shaft, which may come from a tractor, and the like, to the cutting blade assemblies 24, 26. Further, a drive shaft 164, which is advantageously arranged at the bottom portion of frame 12 in order to provide clearance for certain elements within shredder 10, connects the lifting rollers 18 to the power shaft as by a chain and sprocket arrangement 166. A chain and sprocket assembly 168 distributes power from drive shaft 164 to the various rollers 18.

As can be readily seen from FIG. 2 of the drawings, guides 20, 22 are covered with, for example, sheet metal, and the like, in order to increase the effective guide area of these elements. Further, as can be seen by comparing FIGS. 1 and 7 of the drawings, shaft 86 will be raised and lowered by pivotal action of rocker arm 90 in order to raise and lower plow assemblies 28, 30. In regard, it will be appreciated that shaft 170 on which crank 92 is affixed for rotation therewith will extend across frame 12 so that a shaft 86 and slide 88 may be arranged on both sides of frame 12 in order to actuate both plow assemblies 28, 30 simultaneously. As can be seen from FIG. 1, a cantilever-mounted slide 172 fastens standard 32 to shaft 86 so that the plow assemblies are effectively mounted on and supported by the shafts 86.

Many of the structural features of shredder 10 discussed above only generally, or not mentioned herein, are similar or identical to corresponding elements disclosed in the shredder set forth in my prior U.S. Pat. No. 3,160,214, issued Dec. 8, 1964, and accordingly the disclosure of my prior patent is incorporated herein.

Referring now more particularly to the embodiment of the invention shown in FIGS. 11 through 14 of the drawings, a shredder 210 is provided with a frame 212 similar to frame 12 and on which are provided a pair of vertical blade assemblies 214 and 216. Each assembly 214, 216 is associated with a common blade shaft 218 mounted on frame 212 in a plane parallel to and transverse of frame 212, and rotated by a drive to be described below.

Each of the blade assemblies 214, 216 is arranged above lifting rollers 220 similar to pairs 14, 16 of rollers 18, and includes, for example, five blade cluster 222, 224, 226, and 230 affixed to shaft 218 and arranged in parallel planes along the shaft 218. As perhaps best seen in FIG. 13, the blade clusters of each assembly 214, 216 are affixed to shaft 218 for rotation therewith in a substantially vertical plane, or a plane perpendicular to the transverse and longitudinal extents of frame 212. Further, each blade assembly 214, 216 has a generally arcuate protective cover 232 removably disposed thereover, while shaft 218 is rotatably supported by, for example, a plurality of conventional bearings generally designated by the reference numeral 234 and mounted on superstructure of frame 212.

The blade clusters can be composed of, for example, one to five radially extending stationary splayed blades 236 and one to five of radially extending hinged flail blades 238. It will be appreciated that all of the blades of the blade clusters may be the splayed blades 236, the flail blades 238, or a predetermined combination of the blades 236 and the blades 238. As can perhaps best be seen from FIG. 14, the illustrated embodiment includes splayed blades 236 on two of the blade clusters and flail blades 238 provided on the other three of the illustrated five blade clusters.

Referring again to FIG. 12 of the drawings, the drive for shaft 218 advantageously includes pulleys 240 and 242 affixed to shaft 218 for rotating the shaft by means of belts 244 and 246 wrapped around the respective peripheries of pulleys 240 and 242. Belts 244 and 245 are guided as by a common idler 248 to a pulley cluster 250 attached to a vertical shaft 252 connected to a rightangled gear box 254 which transmits power to shaft 254 as from the conventional power take-off shaft 256 connectible in a conventional manner to the power output of a tractor (not shown) and the like.

As will be appreciated from the above description and from FIGS. 11 through 14 of the drawings, power will be transmitted through shafts 256 and 252 to shaft 218 by means of gear box 254 and belts 244, 246 in order to rotate the vertically disposed blade assemblies 214 and 216 which achieve a finer shredding job on the stalks and roots being shredded, as well as provide a shredder which is adaptable to different row spacings of the beds being worked. It will be appreciated that shredder 210, like shredder 10, can be built of any number of units comprising a pair of rollers and an associated vertical, or horizontal, blade shredding assembly.

Blades 236 and 238 may be constructed in a known manner of replaceable hard metal, such as tool steel, in order to provide long lasting and easily replaceable blades.

Figure 6:
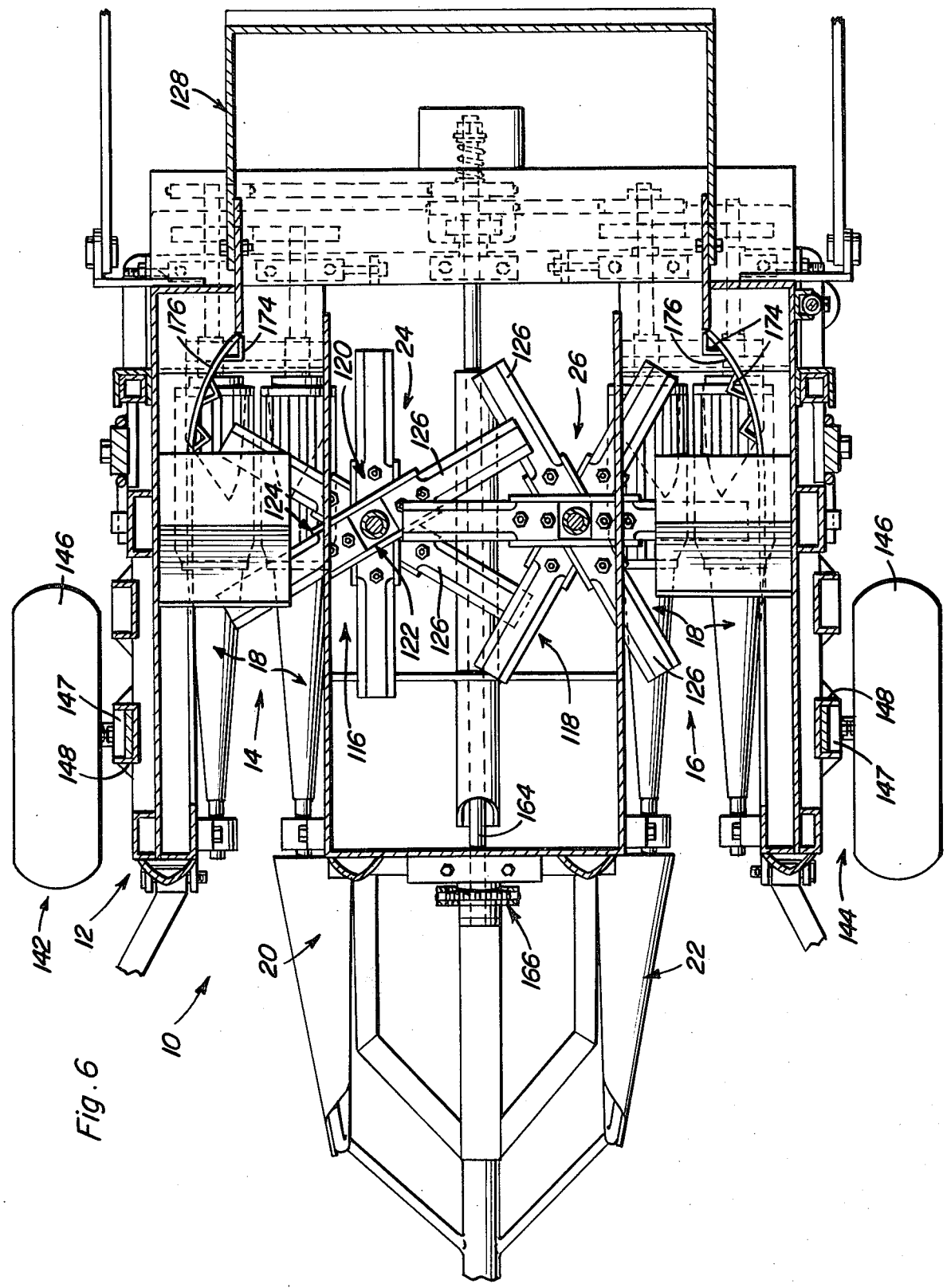
FIG. 6 is a fragmentary, sectional view taken generally along the line 6—6 of FIG. 5.
Figure 11:
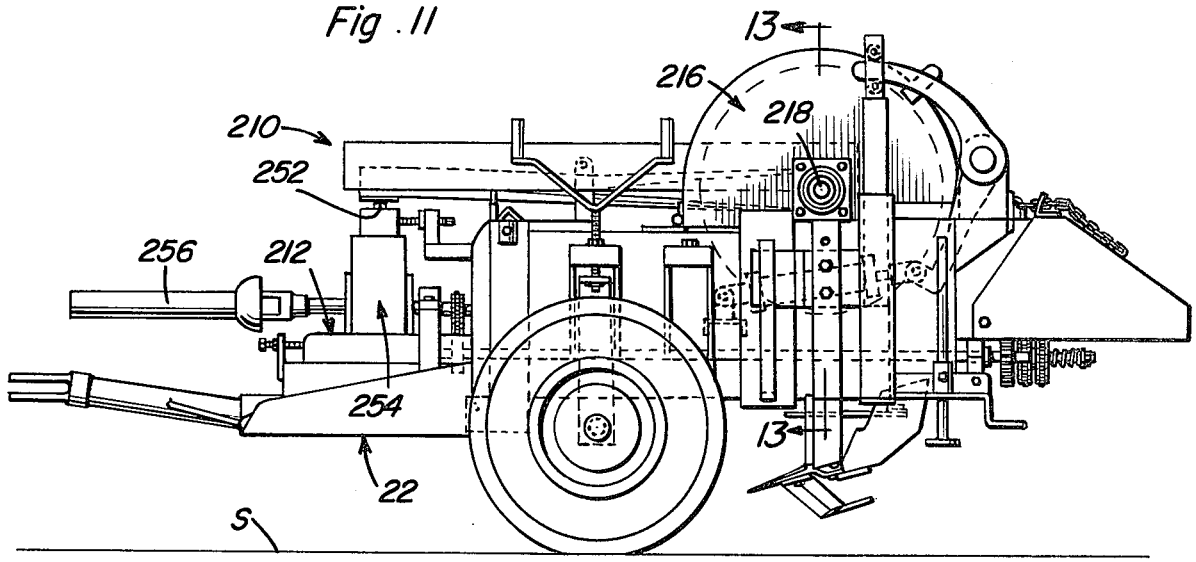
FIG. 11 is a side elevational view showing a modified embodiment of a cotton stalk and root shredder according to the present invention.
Figure 12:
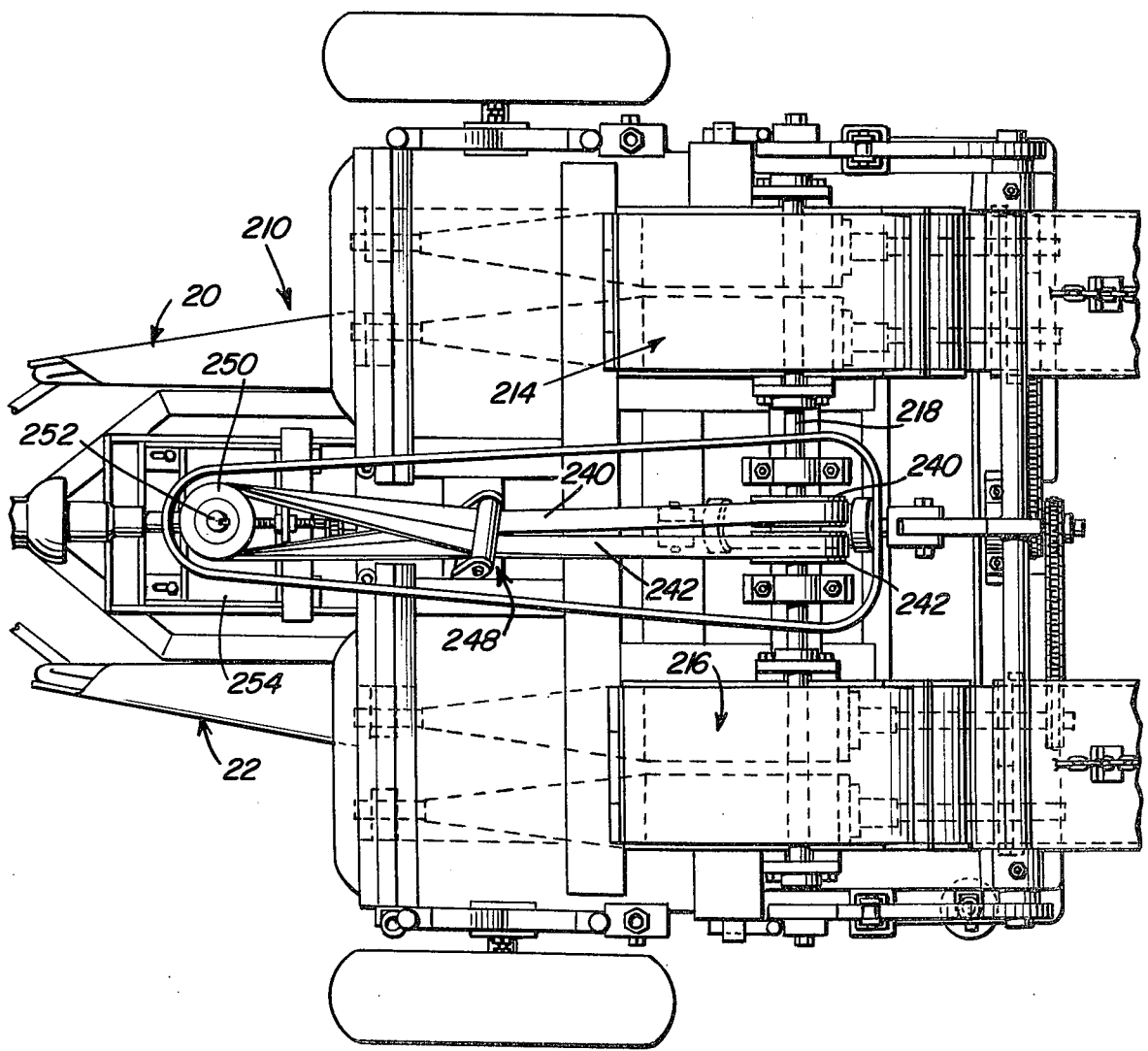
FIG. 12 is a fragmentary, top plan view showing the shredder of FIG. 11.
Figure 13:
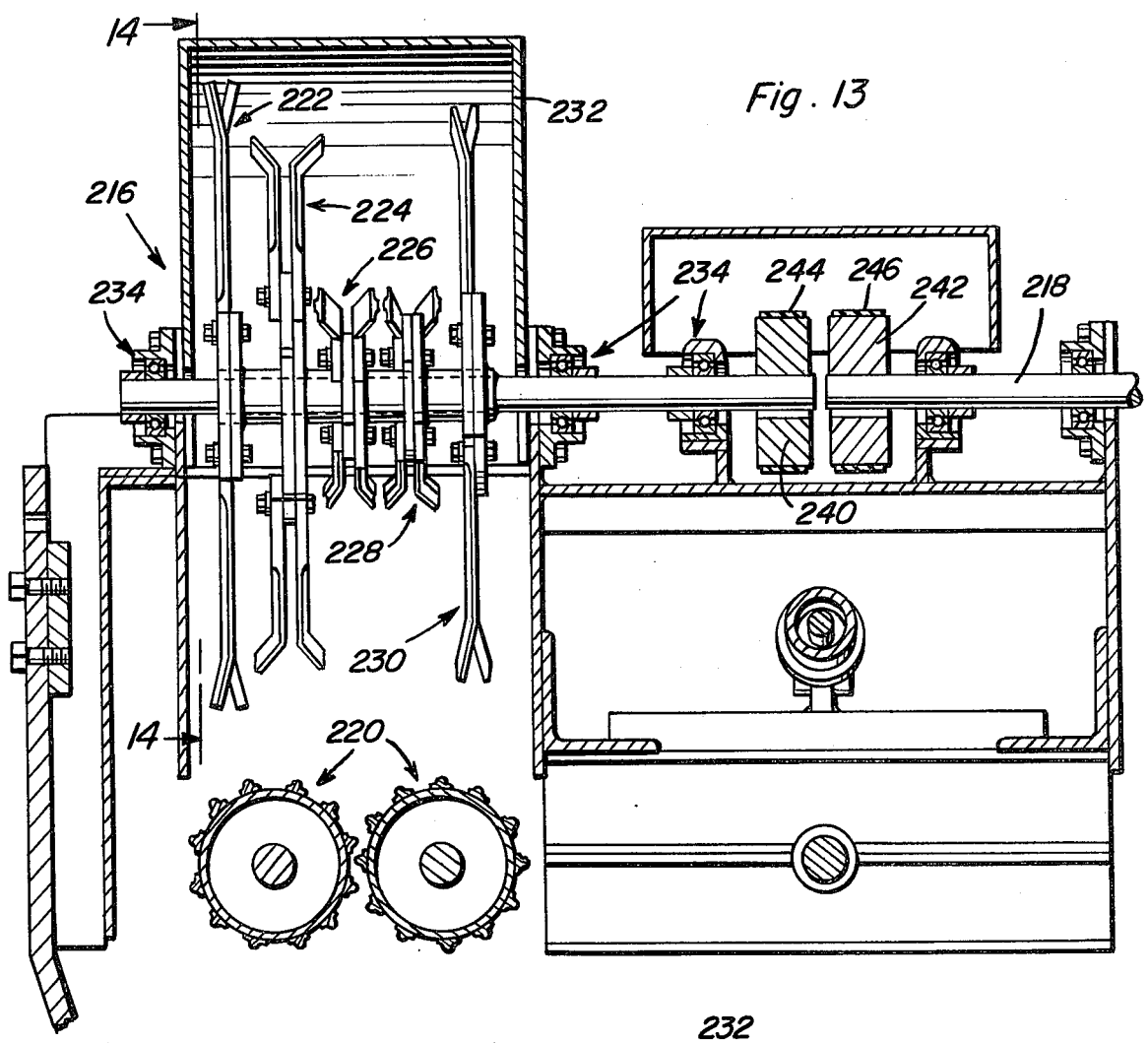
FIG. 13 is a fragmentary, sectional view taken generally along the line 13—13 of FIG. 11, but drawn to a larger scale.
Figure 14:
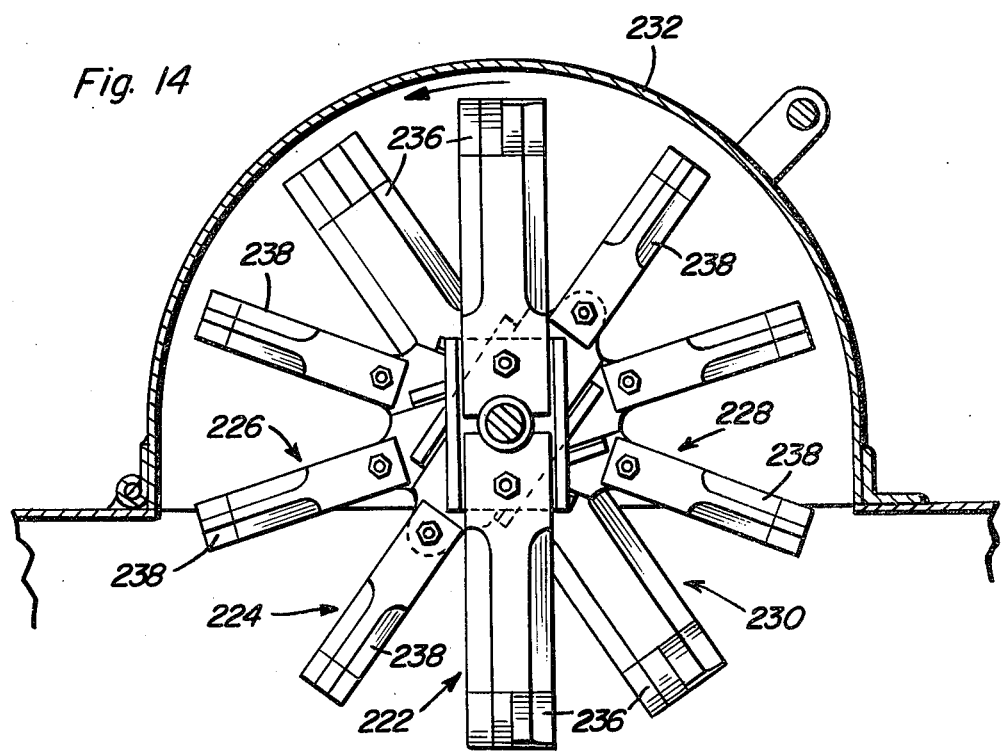
FIG. 14 is a fragmentary, sectional view taken generally along the line 14—14 of FIG. 13.

Referring again to the embodiment of FIGS. 1 through 10 of the drawings, as can be seen in FIG. 6, a plurality of reinforcing angles and material restrictors 174 are shown along the baffle walls 176 so as to cooperate with the blades 120, 122, and 124 to facilitate shredding of the stalks and roots being fed through the associated blade assemblies 24 and 26.

OPERATION

Both shredders 10 and 210 are intended to first work an old bed by digging therein and extracting therefrom the old plant and the roots thereof, crush and shred the plant, while simultaneously furrowing-out shovel blades 44 attached to plow assemblies 24, 26, which may be used with shredder 210 as well as shredder 10, open the beds and prepare a furrow to receive the shredded plant residue which is being discharged from the machine by deflection of rear deflector shield 128. Residue is then blown into the open furrow and the rear disc blades 54, 56, attached to the shredder cover the residue and re-shape the old beds, all in one operation. Shredded debris becomes mulch. The heat created by decomposition of the residue warms up the soil for better seed germination. This environment conserves the soil, water, fertilizer, fuel, and energy in the soil, and mellows the soil in the plant row. Once the identity of the beds is established, soil compaction is completely eliminated in the growing area. The same beds are used year after year, for growing more stalks, and all traffic wheels travel on the same paths away from the growing area. Thus, the rebedding attachements according to the present invention are beneficial in the control of plant pests in cotton by destroying their over-wintering habitat. By extracting the root of the plant, the attachments destroy fruit-attacking parasites and their breeding environments. Further, shredders and their rebedding attachments according to the present invention can be manufactured in, for example, four, six, eight, and other row combinations as desired.

Shredders equipped with re-bedding attachments according to the present invention can be used in "controlled wheel traffic", a system of conservation tillage developed by the the U.S. Department of Agriculture. This system reduces by 80% land preparation, input costs, conserves soil, water, fertilizer, fuel, and energy, and increases yields by 20% or more. Unnecessary field operations are eliminated. A farmer can replant back in the same bed keeping compaction away from the growing area.

In addition, both shredder 10 and shredder 210 can be readily adapted to conventional hydraulic power systems. For example, it has been found suitable to employ units designated "Sundstrand PV 21    running at 1800 rpm driving 4 MF 18's in series at 2200 rpm. With the PV 21 developing 4000 psi, the torque output per motor would be 27 lb-ft and motor horsepower would equal 11.3 horsepower.

The foregoing is considered as illustrative only of the principles of the invention. Further, since numerous modifications and changes will readily occur to those skilled in the art, it is not desired to limit the invention to the exact construction and operation shown and described, and accordingly all suitable modificatons and equivalents may be resorted to, falling within the scope of the invention.

What is claimed as new is as follows:

1. In a root and stalk shredder which includes a frame movable in a direction of movement along a path of travel, a pair of longitudinally extending, parallel, power driven lifting rollers rotatably mounted on the frame and extending longitudinally parallel to the path of travel, guide means mounted on the frame forward of the rollers in the direction of movement of the frame for guiding stalks between the roller, a blade assembly mounted on the frame over the rollers and operatively associated with the rollers for cutting roots and stalks lifted by the rollers, and a plow assembly mounted on the frame; the improvement wherein the plow assembly comprises, in combination:
    a. a standard attached to the frame;
    b. an earth engaging digging blade affixed to the standard and arranged vertically below and centrally between the rollers substantially rearward of the rollers along the path of travel of the frame for effecting a splitting of the earth and freeing of the roots subsequent to an initial grasping of the stalks by the rollers;
    c. a fin including a fin affixed to the undersurface of the digging blade and extending cantilever fashion away from the digging blade and the standard to a free end terminating the fin, and an uplifting wing mounted on the free end of the fin and transversely to the fin, the fin assembly being arranged for fracturing the soil below the digging blade, preventing soil compaction by the digging blade, and facilitating directional plant root growth; and
    d. a furrowing-out shovel blade attached to the standard adjacent to the digging blade and arranged extending substantially rearwardly of the standard along the path of travel of the frame for splitting the bed and leaving a furrow open for receiving shredded crop,
    the improvement further comprising a bed re-shaping assembly arranged rearwardly of the frame relative to the direction of movement of the frame, the bed re-shaping assembly including, in combination:
    1. a pair of notched disc blades;
    2. bracket means mounted on the frame and rotatably mounting the disc blades for lifting and lowering the disc blades relative to the frame and selectively engaging the disc blades in a bed being re-shaped;
    3. first and second tool bars adjustably connected to the bracket means, the disc blades rotatably mounted on the first and second tool bars at a point thereon spaced from the connection of the first and second tool bars to the bracket means; and
    4. a tool bar assembly mounted on the bracket means together with and adjacent to the notched discs, the tool bar assembly including a third tool bar adjustably attached to the first tool bar, and a sweep blade adjustably mounted on the third tool bar at a point thereof spaced from the attachment of the third tool bar to the first tool bar, the first tool bar and third tool bar being arranged extending in substantially parallel planes.

2. A structure as defined in claim 1 wherein the improvement further includes a front disc blade assembly comprising a further disc blade and a pivotally mounted bracket attached to a forward portion of the frame relative to the direction of movement of the frame, the further disc blade rotatably mounted on the pivotally mounted bracket at a point thereon spaced from the frame, the further disc blade arranged for clearing a pathway for the plow assembly through heavy weeds and debris.

3. A structure as defined in claim 2, wherein the further disc blade is provided with a notch having a front part and a rear part relative to the direction of movement of the frame, contact with the ground rotating the further disc blade, with the front part of the notch clearing a pathway and the rear part of the notch lifting stalks up and alining and directing the lifted stalks into the lifting rollers.

4. A structure as defined in claim 3, wherein the improvement further includes the blade assembly comprising three vertically spaced levels of blade clusters, each of the blade clusters including three blades, each of the blades having a pair of radially extending arms, the arms of the blades being equally spaced from one another.

5. A structure as defined in claim 4, wherein the improvement further includes a deflector shield means mounted on the frame and arranged extending toward the disc blades of the bed re-shaping assembly for deflecting shredded residue fed from the blade assembly and directing the residue onto the surface of ground over which the frame is moving.

6. A structure as defined in claim 5, wherein the improvement further includes each of the lifting rollers comprising a cylindrical portion rearward of the forward end of the rollers relative to the direction of movement of the frame, and a sleeve constructed from a resilient material arranged in conforming engagement on the cylindrical portion, the sleeve being provided with a plurality of longitudinally extending outwardly projecting ribs disposed on an outer surface of the sleeve.

7. A structure as defined in claim 6, wherein a plurality of longitudinal rods are embedded in each lifting roller sleeve, each rib having a rod associated therewith, for absorbing shock and prolonging wear of the sleeve.

8. A structure as defined in claim 7, wherein the frame includes a pair of wheel assemblies, each wheel assembly comprising a vertically adjustable wheel, a vertical wheel standard mounted on the wheel, a channel provided on the frame for slidably mounting the wheel standard, and a wheel crank assembly connected to the wheel standard for positioning the wheel standard in the channel, the wheel crank assembly including a threaded rod, a nut affixed to the wheel standard, and a substantially V-shaped handle affixed to the threaded rod, with the latter threadingly engaging the nut, and a wheel bracket mounted on the threaded rod and connecting the rod to the wheel standard.

9. A structure as defined in claim 8, including a duplicate pair of rollers mounted on the frame parallel to and laterally spaced from the first mentioned pair of rollers, the duplicate pair of rollers having associated therewith a duplicate guide means, a duplicate blade assembly, and a duplicate plow assembly, the blade assemblies each including a vertically rotatably mounted shaft, upper and lower horizontal blades provided on each shaft and arranged in overlapping relationship, the path of movement of the blades of one blade assembly overlapping the path of movement of the blades of the other blade assembly, the blade of one blade assembly being vertically offset from the blades of the other blade assembly so as to avoid contact therebetween, both of said assemblies being rotatable inwardly and rearwardly so as to project the cut material rearwardly between the blade asemblies, and angle channel members provided on the frame adjacent the forwardmost outer portions of the paths of travel of the blade clusters of the blade assemblies to facilitate shredding of the residue and debris.

10. A structure as defined in claim 1, wherein the improvement further includes a deflector shield means mounted on the frame and arranged extending toward the disc blades of the bed re-shaping assembly for deflecting shredded residue fed from the blade assembly and directing the residue onto the surface of ground over which the frame is moving.

11. A structure as defined in claim 1, wherein the frame includes a pair of wheel assemblies, each wheel assembly comprising a vertically adjustable wheel, a vertical wheel standard mounted on the wheel, a channel provided on the frame for slidably mounting the wheel standard, and a wheel crank assembly connected to the wheel standard for positioning the wheel standard in the channel, the wheel crank assembly including a threaded rod, a nut affixed to the wheel standard, and a substantially V-shaped handle affixed to the threaded rod, with the latter threadingly engaging the nut, and a wheel bracket mounted on the threaded rod and connecting the rod to the wheel standard.

12. A structure as defined in claim 1, wherein the improvement further includes the blade assembly comprising a blade shaft rotatably mounted on the frame in a plane parallel to and transverse of the frame, and at least one blade cluster affixed to the shaft for rotation therewith in a substantially vertical plane.

13. A structure as defined in claim 12, wherein five blade clusters are affixed to the blade shaft and arranged in parallel planes spaced along the shaft, and an arcuate protective cover removably disposed over the blade clusters.

14. A structure as defined in claim 13, wherein each of the blade clusters includes a plurality of radially extending blades selected from one of stationary splayed blades and hinged flail blades.

15. In a root and stalk shredder which includes a frame movable in a direction of movement along a path of travel, a pair of longitudinally extending, parallel, power driven lifting rollers rotatably mounted on the frame and extending longitudinally parallel to the path of travel, guide means mounted on the frame forward of the rollers in the direction of movement of the frame for guiding stalks between the rollers, a blade assembly mounted on the frame over the rollers and operatively associated with the rollers for cutting roots and stalks lifted by the rollers, and a plow assembly mounted on the frame; the improvement wherein the plow assembly comprises, a combination:

a. a standard attached to the frame;

b. an earth engaging digging blade affixed to the standard and arranged vertically below and centrally between the rollers substantially rearward of the rollers along the path of travel of the frame for effecting a splitting of the earth and freeing of the roots subsequent to an initial grasping of the stalks by the rollers:

c. a fin assembly including a fin affixed to the undersurface of the digging blade and extending cantilever fashion away from the digging blade and the standard to a free end terminating the fin, and an uplifting wing mounted on the free end of the fin and transversely to the fin, the fin assembly being arranged for fracturing the soil below the digging blade, preventing soil compaction by the digging blade, and facilitating directional plant root growth; and c. a furring-out shovel blade attached to the standard adjacent to the digging blade and arranged extending substantially rearwardly of the standard along the path of travel of the frame for splitting the bed and leaving a furrow open for receiving shredded crop, the improvement further including each of the lifting rollers comprising a cylindrical portion rearward of the forward end of the rollers relative to the direction of movement of the frame, and a sleeve constructed from a resilient material arranged in conforming engagement on the cylindrical porton, the sleeve being provided with a plurality of longitudinally extending, outwardly projecting ribs on an outer surface of the sleeve, and a plurality of longitudinal rods embedded in each lifting roller sleeve, each rib having a rod associated therewith, for absorbing shock and prolonging wear of the sleeve.

16. In a root and stalk shredder which includes a frame movable in a direction of movement along a path of travel, a pair of longitudinally extending, parallel, power driven lifting rollers rotatably mounted on the frame and extending longitudinally parallel to the path of travel of the frame, guide means mounted on the frame forward of the rollers in a direction of movement of the frame for guiding stalks between the rollers, a blade assembly mounted on the frame over the rollers and operatively associated with the rollers for cutting roots and stalks lifted by the rollers, and a plow assembly mounted on the frame; the improvement wherein each of the lifting rollers comprises, in combination;

a. a cylindrical portion rearward of a forward end of the rollers relative to the direction of movement of the frame; and b. a sleeve constructed from a resilient material arranged in conforming engagement on the cylindrical portion of the roller, the sleeve being provided with a plurality of longitudinally extending, outwardly projecting ribs on an outer surface of the sleeve, and a plurality of longitudinal rods embedded in each lifting roller sleeve, each rib having a rod associated therewith, for absorbing shock and prolonging wear of the sleeve.

* * * * *